United States Patent [19]

Daiker et al.

[11] 4,351,676
[45] Sep. 28, 1982

[54] METHOD AND APPARATUS FOR POWDER SCARFING OF METAL

[76] Inventors: Artur L. Daiker, ulitsa B.Khmelnitskogo, 27, kv. 14; Anatoly I. Veis, ulitsa Vorovskogo, 9, kv. 77; Evgeny Y. Kochengin, ulitsa Chasovaya, 5, kv. 2; Nikolai M. Novoselov, ulitsa Degtyareva, 89, kv. 58; Gennady Y. Morozov, ulitsa Kommunisticheskaya, 6a, kv. 67; Vladimir S. Rybin, ulitsa Elkina, 84, kv. 29; Nikolai A. Belokur, ulitsa Degtyareva, 40a, kv. 16; Nina A. Savelieva, prospekt Lenina, 71, kv. 141, all of Chelyabinsk, U.S.S.R.

[21] Appl. No.: 285,111
[22] PCT Filed: Nov. 15, 1979
[86] PCT No.: PCT/SU79/00113
§ 371 Date: Jul. 10, 1981
§ 102(e) Date: Jul. 10, 1981
[87] PCT Pub. No.: WO81/01381
PCT Pub. Date: May 28, 1981

[51] Int. Cl.³ .......................... B23K 7/06; B23K 7/08
[52] U.S. Cl. ...................................... 148/9 C; 266/74; 266/75
[58] Field of Search .................... 148/9 C; 266/74, 75

[56] References Cited

U.S. PATENT DOCUMENTS

| 2,444,900 | 7/1948 | Meincke et al. | 266/75 |
| 2,538,876 | 1/1951 | Meincke | 266/75 |
| 2,654,329 | 10/1953 | Fleming, Jr. | 266/75 |
| 2,840,016 | 6/1958 | Chouinard et al. | 148/9 C |

OTHER PUBLICATIONS

Spectre, "Flux-Oxygen Torch Cutting of Stainless Steel", Machinostroyeniye Publishers, Moscow, 1969, pp. 76-78.
Brandstedt, "Flux-Oxygen Cutting and Gouging of Metals", Mashinostroenie Publishers, Moscow, 1961, pp. 39-41, 74-76.

Primary Examiner—W. Stallard
Attorney, Agent, or Firm—Fleit & Jacobson

[57] ABSTRACT

A method for powder scarfing of metal resides in that combustible gas and oxygen are fed to a zone (9) of treating a metal (10) in order to form a heating flame. Then, flux is delivered by means of a flux-carrier gas, whereupon the former is separated from the latter, and the separated gas is discharged. The flux is directed to the zone (9) of treating the metal (10) in-between the jets of combustible gas and oxygen, whereupon the flux is melted in a heating flame to form a molten bath in the metal treating zone (9). An apparatus for carrying into effect the above method comprises a body (1) formed with ducts (2), (7), (13) and (16) for supplying combustible gas, oxygen and flux therethrough, which open into an outlet cavity (8) presented to the metal treating zone (9). Mounted on the body (1) is a separating chamber (18) having a gas outlet (23) and a pipeline (21) for supplying flux into the separating chamber (18) by means of a flux-carrier gas. The separating chamber (18) has its bottom part, adjoining the body (1), formed with a flux outlet opening (25), and the wall of the body (1) adjoining the separating chamber (18), has a tapered projection (26) spaced opposite the flux outlet opening (25). Formed by the tapered projection (26) and the walls of the body (1) is an annular cavity (27) which is brought in communication with the outlet cavity (8) through ducts (32), intended for supplying flux to the zone (9) of treating the metal (10).

3 Claims, 3 Drawing Figures

METHOD AND APPARATUS FOR POWDER SCARFING OF METAL

FIELD OF THE INVENTION

The present invention relates to methods of treating ferrous metals, and more particularly, to a method and apparatus for powder scarfing of metals.

BACKGROUND OF THE INVENTION

There is known in the art a method and apparatus for powder scarfing of metal, wherein flux fed from a flux-supply source is injected directly into a jet of oxygen delivered under high pressure to protect the metal being treated.

The flux-oxygen mixture passes through a central channel provided in the body of the powder scarfing apparatus, and then to the metal treating zone.

The flux is heated in the jet of burning oxygen, where it is melted and then is passed onto the metal surface to form a molten bath in the treating zone (see a book by O. Sh. Spectre entitled "Flux-Oxygen Torch Cutting of Stainless Steels", published in 1969 by Mashinostroenie Publishers, Moscow, p.76).

There is also known a method and apparatus for powder scarfing of metal, wherein flux is supplied from an outside source. In this case the flux is supplied by means of a flux-carrier gas through a heating flame of the apparatus and further into the jet of oxygen affording protection to metal.

The molten flux is passed in the mixture of gases into the metal treating zone.

In the apparatus used for carrying into effect the above method, flux is supplied by means of a flux-carrier gas to the metal treating zone from a flux adapter positioned above the body formed with oxygen and flux supply channels (see a book by Brandshtedt, entitled "Flux-Oxygen Deep and Surface Cutting of Metals", published in 1961 By Mashinostroenie Publishers, Moscow, p.75).

However, the powder scarfing methods described above are disadvantageous in that they allow an appreciable amount of flux to be lost due to high speed of its delivery. For the same reason, the part of the flux that gets to the metal treating zone is not kept there for sufficient time to be heated to a kindling temperature, which prevents its participation in the combustion process. As a result, the consumption of flux is substantially increased.

The prior art teaches another method and apparatus for powder scarfing of metal (see a book by B. Brandshtedt, entitled "Flux-Oxygen Deep and Surface Cutting of Metals", published in 1961 by Mashinostroenie Publishers, Moscow, p.40), wherein oxygen and combustible gas, required to form a heating flame and to effect the metal treating operation, are fed to the metal treating zone onto the metal surface. Then, flux, delivered by means of a flux-carrier gas from a flux source, is introduced through the heating flame into the jet of oxygen. Once in the heating flame, the flux is heated and melted therein, whereafter it is passed together with the metal-scarfing oxygen to the metal treating zone to form a molten bath therein.

The apparatus for performing the above-described method comprises a body with an oxygen supply channel formed in the central portion thereof. Provided in the body around the above channel is an annular orifice through which passes the oxygen-gas mixture on its way to the heating flame.

Flux is supplied by means of a flux-carrier gas to the metal treating zone through channels formed in the body of the apparatus around the annular opening and spaced at an angle to the axis of the central opening.

It should be observed that in the above method the flux-carrier gas tends to lower the degree of oxygen purity, which, in turn, impairs the flux melting process. Due to a high rate of flux delivery, an appreciable amount thereof fails to reach the metal treating zone while flying past it. For the same reason, a part of the flux mass is not heated to a metal melting temperature, with the resultant increase in the consumption of flux and oxygen. In addition, it takes considerable amount of time to form a bath of molten metal.

DISCLOSURE OF THE INVENTION

The invention has as its aim the provision of a method and apparatus for powder scarfing of metal, which will permit flux and oxygen to be used more effectively along with the reduction in time required to form a molten bath in the metal treating zone.

This aim is attained in a method for powder scarfing of metal, comprising supplying a combustible gas and oxygen to a metal treating zone, delivering flux by means of a flux-carrier gas, melting the flux and introducing it into the metal treating zone, according to the invention, prior to be melted, the flux is separated from the flux-carrier gas, the latter being then discharged, whereupon the flux is melted and then is fed to the metal treating zone in-between the jets of combustible gas and oxygen.

The invention also provides an apparatus for carrying into effect the method of powder scarfing of metal, comprising a body formed with ducts for supplying combustible gas, oxygen and flux therethrough, wherein, according to the invention, there is provided a separating chamber fitted with a cover having a gas outlet, said chamber being intended for separation of flux from a flux-carrier gas and mounted on the body, the separating chamber having its bottom formed with a flux outlet opening, and the body wall, adjoining the separating chamber, having a tapered projection spaced opposite the flux outlet opening, and wherein a cavity, formed by the tapered projection and the body walls, is brought in communication with the flux supplying ducts having their outlet openings spaced between outlet openings of the combustible gas-, and oxygen supplying ducts.

It is preferable that the intake section of the gas outlet provided in the separating chamber be made in the form of a cone-shaped umbrella arranged inside the separating chamber with a gap relative to its walls, said chamber being cylindrical in shape in its upper part and having its lower part sloping towards the flux outlet opening.

The method and apparatus for powder scarfing of metal according to the invention permit more effective use of flux and oxygen and allow the time period required for forming a molten bath in the metal treating zone to be reduced to 2-4 sec.

BRIEF DESCRIPTION OF THE DRAWINGS

The invention will now be described, by way of example only, with reference to the accompanying drawings, wherein.

BEST MODE OF CARRYING OUT THE INVENTION

Figure 1:
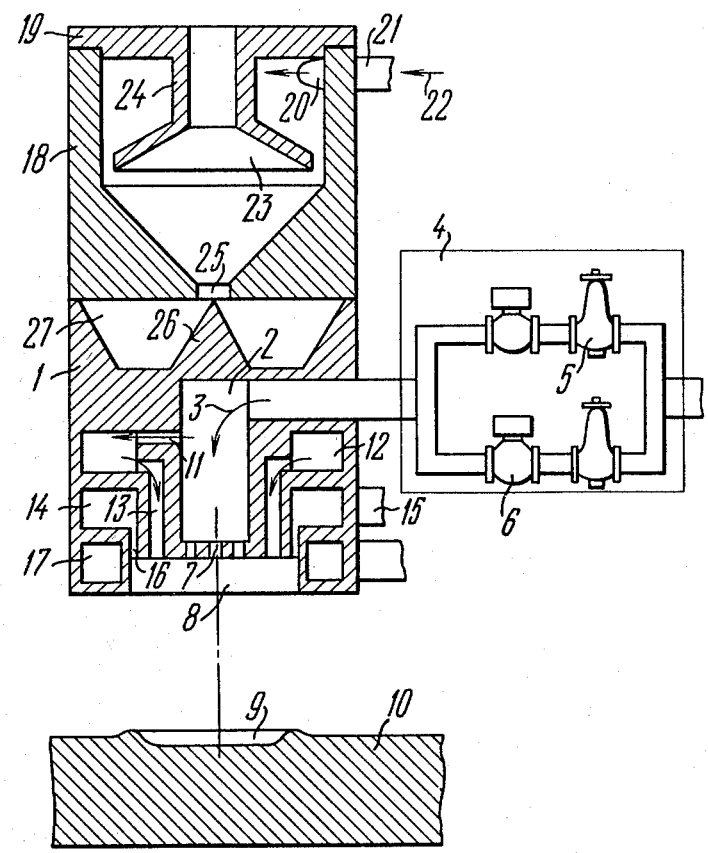
FIG. 1 is a general view, in longitudinal section, of an apparatus for carrying into effect a method for powder scarfing of metal, provided with a pressure regulator, according to the invention.

The apparatus illustrated comprises a body 1 (FIG. 1) which is formed, for example, of bronze used to ensure more effective transfer of heat. The body 1 is formed with an L-shaped channel 2 intended for the supply of oxygen. The path of oxygen distribution is indicated by arrows 3. Set at the inlet of the channel 2 is a pressure regulator 4 provided in the form of reducing valves 5 connected to electromagnetic valves 6. The outlet of the channel 2 is formed as a nozzle made up of a plurality of narrow ducts 7 which open into an outlet cavity 8 presented to a treating zone 9 on the surface of a metal 10. There is provided a horizontal duct 11 intended to communicate the channel 2 with an annular oxygen header 12 which is brought in communication with the outlet cavity 8 through other oxygen supplying ducts 13.

Provided in the apparatus body 1 is a gas header 14 intended for supplying a combustible gas fed from a gas source (not shown) along a pipeline 15. The annular gas header 14 is brought in communication with the outlet cavity 8 through ducts 16 intended for supplying combustible gas required for the formation of a heating flame in the interspace between the outlet cavity 8 and the metal treating zone 9. The body 1 is cooled by means of an annular water-cooling passage 17, through which the cooling water is passed.

Mounted on the body 1 is a separating chamber 18 with a cover 19. The separating chamber 18 has its side wall formed with an opening 20 brought in communication with a pipeline 21 through which flux is delivered by means of a flux-carrier gas to the separating chamber 18 (see arrow 22). The cover is fitted with a gas-outlet 23 intended for the flux-carrier gas to be vented therethrough. The intake section of the gas outflow 23 is made in the form of a cone-shaped umbrella tapering towards a cylindrical outlet pipe 24. The umbrella-shaped intake section of the gas outlet 23 is spaced with a gap relative to the inner walls of the separating chamber 18. In the upper part, the inner walls of the separating chamber 18 are made cylindrical in shape to permit effective deposition of flux thereon. Fitted in the lower part of the separating chamber 18, adjoining the body 1, is a flux outlet opening 25. The inner walls of the separating chamber 18 are tapered in the lower part thereof towards the outlet opening 25. Formed in the wall of the body 1, adjoining the separating chamber 18, is a tapered projection 26 with the top thereof being spaced opposite the flux outlet opening 25. The walls of the body 1 and the tapered projection 25 form an annular cavity 27 provided to ensure uniform distribution of the in-coming flux passing through the opening 25.

Figure 2:
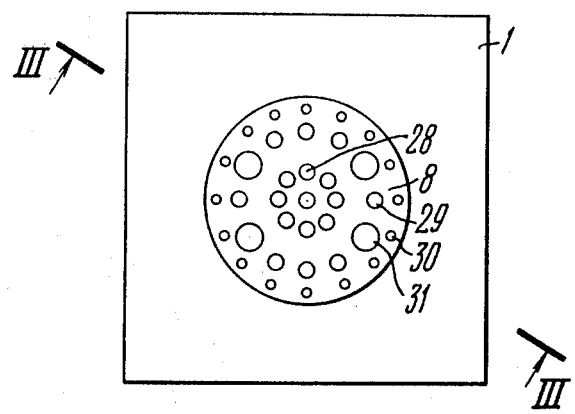
FIG. 2 is a bottom view of an apparatus for carrying into effect a method for powder scarfing of metal, according to the invention.

Shown in FIG. 2 is a space arrangement of outlet openings 28, 29 and 30 relative to the respective oxygen outlet ducts 7 (FIG. 1), 13 and the combustible gas ducts 16. The outlet cavity 8 (FIG. 2) is annular in shape, and the outlet openings 30, 29 and 28 of the ducts 16 (FIG. 1), 13 and 7 are arranged over three concentrical circumferences.

Disposed over the circumference with the greatest radius are the outlet openings 30 (FIG. 2) of the ducts 16 (FIG. 1), and disposed over the inner circumference, as well as in the centre of the outlet cavity, are the outlet openings 28 (FIG. 2) of the oxygen supplying ducts 7 (FIG. 1). And, finally, disposed alternately over the intermediate circumference are the outlet openings 29 (FIG. 2) of the ducts 13 (FIG. 1) and the flux outlet openings 31.

Figure 3:
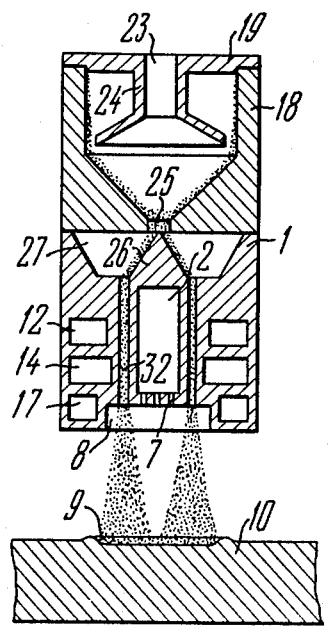
FIG. 3 is a cross-section III—III of FIG. 2.

As is shown in FIG. 3, which is a section taken along III—III, the annular cavity 27 is brought in communication with the outlet openings 31 (FIG. 2) and with the outlet cavity 8 (FIG. 3) through flux outlet passages 32 along which the flux (shown in dots) is fed from the separating chamber 18 to the metal treating zone 9 to form a molten bath therein.

The method of the invention is performed with the aid of the apparatus of the invention in the following manner.

A combustible gas and oxygen are respectively fed along the pipeline 15 (FIG. 1) through the annular gas header 14 and the duct 16, and along the channel 2 through other ducts 7 into the outlet cavity 8. The pressure of oxygen in the channel 2 is maintained at a lower-than-usual level, on the order of 0.8 to 2 kg/cm$^2$. A mixture of combustible gas and oxygen is inflamed to form a heating flame at the interspace between the metal treating zone 9 and the outlet cavity 8. Flux is delivered along the pipeline 21 by means of a carrier gas to be introduced thereby into the separating chamber 18 (FIG. 3). In the separating chamber 18, the flow of the flux-carrier gas is brought into vortex with the flux. Under the action of centrifugal force the flux is forced towards the inner wall of the chamber 18 to be thereby separated from the flux-carrier gas, which is then freely vented to the atmosphere through the gas outlet 23. Under its own weight and under the effect of air pressure, the flux is brought down along the sloping inner walls of the separating chamber 18 towards the opening 25.

Flowing over the tapered projection 26, the flux is uniformly distributed over the bottom of the annular cavity 27 wherefrom it is directed along the passages 32 to the zone 9 of treating the metal 10. As mentioned above, the supply of flux is effected through the openings 31 (FIG. 2) of the passages 32 (FIG. 3), which are disposed in the interspace between the outlet openings 29 and 30 (FIG. 3) of the respective ducts 13 and 16 (FIG. 1) along which combustible gas and oxygen are passed to form a heating flame. The mass of flux surrounded by the flame is heated and then is melted in the interspace between the outlet cavity 8 and the zone 9 of treating the metal 10. The speed at which flux falls down from the passages 32 (FIG. 3) is smaller in the given case, as compared to that in known apparatus, since it is determined only by the force of the flux gravity. By virtue of this fact, the flux is maintained in the heating flame for a time period long enough to permit its complete melting. The openings 29 and 30 (FIG. 2) of the combustible gas ducts 16 (FIG. 1) and of the oxygen ducts 13 are disposed in direct proximity with the outlet openings 31 (FIG. 2) of the passages 32 (FIG. 3) intended for the supply of flux, which ensures good intermixing of flux and oxygen and promotes complete melting of the former. Owing to this fact, the entire mass of flux actively participates in the formation of molten bath in the zone 9 of treating the metal 10. Since the cross-sectional area of the opening 25 of the separating chamber 18 (FIG. 1) is smaller than the overall cross-sectional area of the flux outlet openings 31 (FIG. 2), the flux tends to accumulate in the lower part of the separating chamber 18, thereby blocking the passage of the flux-carrier gas.

On passing to the metal treating zone 9 (FIG. 1), the flux acts to form a molten bath on the surface of the metal 10 under protection. Then, the pressure regulator 4 (FIG. 1) is used to mount oxygen pressure in the channel 2. The bulk of oxygen under elevated pressure is thus caused to pass through the ducts 7 to the treating zone 9 to effect the metal treating operation therein. As the metal 10 moves, the treating zone 9 is shifted over the entire surface of the metal 10.

With the method and apparatus of the invention it becomes possible to make more effective use of flux and oxygen owing to substantially complete melting of flux in the heating flame. More effective use of oxyyen is also ensured by that flux is separated from the flux-carrier gas, whereby the latter is prevented from penetrating to the treating zone 9 to be intermixed with oxygen therein. The method also makes it possible to reduce the time period required for the formation of molten bath in the treating zone 9, which is due to the fact that the entire mass of molten flux, embraced by the heating flame, is not permitted to deviate from the treating zone 9 but instead is caused to actively participate in the formation of molten bath.

INDUSTRIAL APPLICABILITY

The method and apparatus of the invention can be advantageously used in rolling shops of metallurigcal works for flame scarfing of metal varying in size and shape.

What we claim is:

1. A method for powder scarfing of metal, comprising supplying a combustible gas and oxygen to a metal treating zone, delivering flux by means of a flux-carrier gas, melting the flux and feeding it to the metal treating zone, characterized in that prior to being melted, the flux is generated from the flux-carrier gas and the latter is discharged whereupon the flux is melted and then fed to the zone (9) of treating the metal (10) in-between the jets of combustible gas and oxygen.

2. An apparatus for performing the method of claim 1, comprising a body formed with ducts for supplying combustible gas, oxygen and flux, characterized in that there is provided a separating chamber (18) having a gas outlet (23) intended for separating the flux from the flux-carrier gas and mounted on the body (1), the bottom part of the separating chamber (18) being formed with a flux outlet opening (25), and the wall of the body (1) adjoining the separating chamber (18), having a tapered projection (26) spaced opposite the flux outlet opening (25), and wherein a cavity (27), formed by the tapered projection (26) and the walls of the body (1) is brought in communication with the flux supplying ducts (32) having their outlet openings (31) spaced between the outlet openings (28), (29) and (30) of the combustible gas-, and oxygen supplying ducts (7), (13) and (16).

3. An apparatus as claimed in claim 2, characterized in that the intake section of the gas outlet (23) is made in the form of a cone-shaped umbrella arranged inside the separating chamber (18) with a gap relative to its walls, said chamber being internally formed cylindrical in its upper part and having its lower part sloping towards the flux outlet opening (25).

* * * * *